United States Patent [19]

Rauline

[11] Patent Number: 5,227,425
[45] Date of Patent: Jul. 13, 1993

[54] COPOLYMER RUBBER COMPOSITION WITH SILICA FILLER, TIRES HAVING A BASE OF SAID COMPOSITION AND METHOD OF PREPARING SAME

[75] Inventor: Roland Rauline, Durtol, France

[73] Assignee: Compagnie Generale des Etablissements Michelin-Michelin & Cie, Clermont-Ferrand Cedex, France

[21] Appl. No.: 839,198

[22] Filed: Feb. 20, 1992

[30] Foreign Application Priority Data

Feb. 25, 1991 [FR] France .................. 91 02433

[51] Int. Cl.$^5$ .................. C08J 5/10; C08K 3/34; C08L 19/00
[52] U.S. Cl. .................. 524/493; 524/571; 525/99; 525/316
[58] Field of Search .................. 524/571, 493; 525/99, 525/316

[56] References Cited

U.S. PATENT DOCUMENTS

| | | | |
|---|---|---|---|
| 3,867,326 | 2/1975 | Rivin et al. .................. | 260/37 N |
| 4,590,052 | 5/1986 | Chevallier et al. .................. | 423/335 |
| 5,036,138 | 7/1991 | Stamhuis et al. .................. | 525/99 |

Primary Examiner—Paul R. Michl
Assistant Examiner—U. K. Rajguru
Attorney, Agent, or Firm—Brumbaugh, Graves, Donohue & Raymond

[57] ABSTRACT

A sulfur-vulcanizable rubber composition obtained by thermomechanical working of a conjugated diene compound and an aromatic vinyl compound prepared by solution polymerization in a hydrocarbon solvent having a total content of aromatic vinyl compound of between 5% and 50% and a glass transition temperature (Tg) of between 0° C. and −80° C. with 30 to 150 parts by weight per 100 parts by weight of elastomer of a silica having a BET surface area of between 100 and 250 m$^2$/g, a CTAB surface area of between 100 and 250 m$^2$/g, an oil absorption measured in DBP of between 150 and 250 ml/100 g, and an average projected area of the aggregates greater than 8500 nm$^2$ before use and between 7000 and 8400 nm$^2$ after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

19 Claims, No Drawings

COPOLYMER RUBBER COMPOSITION WITH SILICA FILLER, TIRES HAVING A BASE OF SAID COMPOSITION AND METHOD OF PREPARING SAME

BACKGROUND OF THE INVENTION

The object of the present invention is a sulfur-vulcanizable rubber composition having a base of a copolymer conjugated diene and an aromatic vinyl compound preferably having silica as majority filler, which can be used for the manufacture of high-performance tires in all seasons.

Since savings in fuel and the battle against nuisances created by motor vehicles have become a priority, the purpose of the designers of tires is to produce a tire which has both very little rolling resistance, excellent adherence both to dry ground and to wet and snow-covered ground, very good resistance to wear and, finally, reduced noise of travel.

Numerous solutions have been proposed in order to decrease the rolling resistance of tires, in particular by modifying the rubber compositions used for the treads of the tires. Thus, for rubber compositions which are reinforced with carbon black, it was initially proposed to reduce the content of carbon black. It was then proposed, as in U.S. Pat. No. 4,822,844, to use a carbon black having specific characteristics expressed by a specific iodine absorption surface (IA) and nitrogen absorption surface ($N_2SA$), as well as by an average size of well-defined carbon particles. Another solution described in U.S. Pat. No. 4,866,131 proposed the use as tread composition of a copolymer of butadiene and styrene prepared in solution and of low molecular weight in mixture with another conventional copolymer prepared in solution or emulsion. Finally, in U.S. Pat. No. 4,894,420, it was proposed to use a tread formed of a blend of cis 1,4-polyisoprene and a diene/acrylonitrile copolymer. However, none of the solutions proposed up to now has proven satisfactory since the improvement in the rolling resistance is accompanied by a decrease in one or more essential properties, such as the reduction of adherence on wet and/or snow-covered ground or a reduction in the resistance to wear, and, furthermore, all of these solutions are always fully dependent on petroleum. It has also been proposed to use as reinforcing fillers white fillers such as silica, bentonite, clay, titanium oxide, talc, etc., which have the advantage of not being obtained from petroleum and of decreasing the resistance to travel of the tires having a tread comprising such fillers. However, the use of silica in tread compositions has still remained an exception and has frequently represented only a minority fraction of the total filler as described in U.S. Pat. No. 4,894,420 and U.S. Pat. No. 4,820,751 in view of the resultant decline in the properties, in particular the decline in the resistance to wear. In order to remedy this situation, European Patent Application 299 074 proposed a rubber composition comprising silica as reinforcing filler in very large proportions and which is based on a polymer which is functionalized by means of a special alkoxy silane compound having a non-hydrolyzable alkoxy group. However, this solution is restrictive in that it permits the use only of a very specific family of silanes, which constitutes a handicap for industrial use.

SUMMARY OF THE INVENTION

It has surprisingly and unexpectedly been found that the use of a copolymer of conjugated diene with an aromatic vinyl compound prepared in solution with a special silica, known per se, carried out so as to obtain an excellent dispersion of the silica in the elastomeric matrix makes it possible to obtain a rubber composition which can be used as tire tread having all the known advantageous properties obtained by silica and all those customarily reached due to the use of carbon black.

The object of the present invention is a sulfur-vulcanizable rubber composition having a base of a copolymer of conjugated diene and an aromatic vinyl compound containing silica as reinforcing filler, characterized by the fact that a copolymer of a conjugated diene and an aromatic vinyl compound prepared by polymerization in solution in a hydrocarbon solvent and having a total content of aromatic vinyl compound of between 5% and 50% by weight and a glass transition temperature of between 0° C. and −80° C. measured by ATD and 30 to 150 parts by weight to 100 parts by weight of rubber of a filler formed of a silica having a BET surface area of between 100 and 250 m$^2$/g, a CTAB surface area of between 100 and 250 m$^2$/g, an oil absorption measured in DBP of between 150 and 250 ml/100 g, and an average projected area of the aggregates of more than 8500 nm$^2$ before use and between 7000 and 8400 nm$^2$ after thermomechanical mixing, as well as the additives conventionally used in rubber compositions, with the exception of the vulcanization system, are subjected to a mechanical working comprising at least one thermal step having a maximum temperature of between 130° C. and 180° C. and preferably more than 145° C. for a suitable period of time which is a function of the temperature selected for the mechanical work, the nature of the components, and the volume subjected to the said thermomechanical work, and then are subjected to a finishing step consisting of adding the sulfur vulcanization system by mechanical working at a temperature below the vulcanization temperature, and preferably at a temperature below 100° C.

The rubber composition in accordance with the invention is particularly suitable for the manufacture of treads of tires intended, in particular, for passenger cars, all-terrain four-by-four light vehicles, pickup trucks and motorcycles. Treads having the composition in accordance with the invention can be used for the manufacture of tires or for the recapping of worn tires.

The rubber composition of the invention confers upon a tread of a motor vehicle an excellent compromise between contradictory properties, that is to say it simultaneously confers very low rolling resistance, improved adherence on wet ground, improved adherence on snow-covered ground, very good resistance to wear substantially equal to that obtained with carbon black and less deformation of the reliefs (blocks or ribs) of rubber by aging due to travel, and this while reducing the noise produced by the tire during travel.

The obtaining of such a level of compromise is entirely surprising and unexpected to the person skilled in the art who knows that the use of silica normally results in an important decline in the resistance to wear and that the use of a butadiene/styrene copolymer prepared in solution can result in a decline in the resistance to wear and who therefore expects to obtain catastrophic resistance to wear, while nothing like this happens since it is substantially equal to that of a composition containing carbon black as reinforcing filler.

This unexpected and unforeseeable character also results from the fact that it is generally believed by the person skilled in the art, on the one hand, that a low rolling resistance is contradictory to very good adherence on wet ground and, on the other hand, that good adherence on wet ground is contradictory to good adherence on snow-covered ground while the composition in accordance with the invention makes it possible to obtain an excellent compromise of reduced rolling resistance, very good adherence on wet ground and very good adherence on snow-covered ground. Furthermore, the composition in accordance with the invention makes it possible to reduce the noise given off by the tread upon travel of the tire.

DESCRIPTION OF PREFERRED EMBODIMENTS

In order to obtain a composition in accordance with the invention which has all of these properties, it is necessary to use a copolymer of a conjugated diene with an aromatic vinyl compound prepared in known manner in solution in a hydrocarbon solvent in the presence of an initiator of an alkaline or alkali-earth metallic compound, as described, for instance in French Patent 2 295 972. This copolymer can be used by itself or mixed with at least one other diene elastomer, in particular polyisoprene, natural rubber or polybutadiene. The elastomer used in the blend is preferably polybutadiene having more than 90% cis-1,4 bonds obtained by known methods of catalysis with the use of transition metals as described, for instance, in French Patent 1 436 607. This other diene elastomer can be present in variable proportions with respect to the copolymer prepared in solution, and preferably up to 70 parts by weight.

As conjugated diene, there are suitable, in particular, butadiene-1,3, isoprene, and 2,3-dimethyl-1,3-butadiene. As aromatic vinyl compound, there are suitable, in particular styrene, ortho-, meta- and para-methylstyrene or the commercial "vinyl-toluene" mix.

The copolymer of conjugated diene and aromatic vinyl compound prepared in solution should have a total content of styrene of between 5 and 50% by weight and a glass transition temperature (Tg) of between 0° and −80° C. when measured by differential thermal analysis. The content of vinyl bonds in the butadiene fraction incorporated can be between 20 and 80%, the content of trans-1,4 bonds can be between 20 and 80%, and the content of cis 1,4 bonds is complementary to the contents of vinyl bonds plus trans-1,4 bonds. The vinyl bonds content of the copolymer is preferably greater than 50%.

The silica which can be used as reinforcing filler in the composition of the invention is any particulate silica which has a BET surface area of between 100 and 250 $m^2/g$ and preferably a BET surface area of between 130 and 220 $m^2/g$, a CTAB surface area of between 100 and 250 $m^2/g$, and preferably a CTAB surface area of between 150 and 200 $m^2/g$, an oil absorption measured in DBP of between 150 and 250 ml/100 g, and an average projected area of the aggregates greater than 8500 $nm^2$ and preferably between 9000 and 11000 $nm^2$ before use and between 7000 and 8400 $nm^2$ after thermomechanical mixing with an elastomer. The particulate silica selected may be used alone or in the presence of other fillers, such as carbon black or another conventional silica, that is to say, one not having all of the characteristics indicated above. The improvement in the properties is greater the larger the proportion of the particulate silica referred to the other fillers possibly present. Preferably, the particulate silica is used in a majority proportion with respect to the amount of other filler, such as carbon black, which is present. The improvement is optimal when the particulate silica constitutes all of the filler.

As particulate silica which can be used in the composition of the invention, there is suitable, for instance, the silica obtained by the method described in European Patent Application 157 703.

The measurements of the BET and CTAB surface areas, as well as the oil absorption, are effected in accordance with the methods described in European Patent Application 157 703.

The average projected area of the silica is determined by the following method. 150 mg of silica are introduced into a beaker containing a mixture of 10 ml of water and 20 ml of isopropyl alcohol; the mixture is agitated with ultrasonics for 60 minutes, after which, while continuing the ultrasonic agitation, one or two drops of 10 microliters of the content of the beaker are removed by a micropipette and placed on the grating of a copper electronic microscope with carbonized Formvar membranes. Three successive samples are deposited on three gratings, each having about 3400 aggregates. The average projected area of 10,000 aggregates is determined by effecting a measurement "ON-LINE" by a coupling of an electronic transmission microscope and an analyzer of images enlarged 100,000 times. This method is used to calculate the average projected area of the silica on the one hand before use in the composition and on the other hand after extraction of a composition, tread or tire, whether or not vulcanized.

The extraction of the silica of a rubber mix is effected in the following manner:

The non-vulcanized or vulcanized rubber mix is cut into fine sheets which are placed for one hour in a pyrolysis furnace swept by a stream of nitrogen brought to a temperature of 525°±25° C. and are then removed from the furnace when it has cooled to a temperature close to 100° C. The residue of the pyrolysis after having been coarsely crushed is placed in a beaker into Which there are added 50 ml of hydrochloric acid of 22° Baume and 50 ml of water, the entire mixture being brought to boiling for 10 minutes, whereupon it is allowed to cool and the cooled liquid is then filtered under vacuum on a Whatman ash-free filter No. 42 CAT No. 1 442 055. The filtration residue is washed twice with 20 ml of bidistilled water and then with 20 ml of acetone in order to eliminate the impurities present in the pyrolysis residue, after which the silica is recovered. If the initial mixture contains carbon black, the residue recovered after washing is introduced into a muffle furnace under air which is brought to a temperature of 800° C., where it stays for one hour, after which the silica is recovered in the form of a white powder.

The composition in accordance with the invention also contains the other components and additives customarily used in rubber mixes, such as plasticizers, pigments, anti-oxidants, sulfur, vulcanization accelerators, napthenic or aromatic extender oils if the presence of an extension oil is desired, a reinforcing agent such as a silane, a silica coupling agent, etc.

In order to obtain a composition in accordance with the invention which has all of the properties and in particular very good resistance to wear, the copolymer prepared in the solution and the particulate silica must be subjected to mechanical working in any suitable device, such as for instance, a mixer or an extruder for the period of time suitable in order to produce at least one thermal step the minimum of which to be reached and the maximum temperature not to be exceeded are between 130° C. and 180° C., and preferably, between 145° C. and 180° C.

The appropriate duration of the thermomechanical working varies as a function of the operating conditions employed by the person skilled in the art and, in particular, the temperature selected, included within the range of the indicated values, and the nature and volume of the components submitted to the mechanical work, the essential factor being that the mechanical work initiates an excellent predispersing of the silica resulting in a decrease in the size of the silica particles and that the required thermal intensity is reached by the time-temperature combination, and this independently of the number of steps used to reach this level of intensity in order that it be accompanied by a maximizing of the ratio of the 300% elongation modulus to the 100% elongation modulus. Thus, as a function of the thermomechanical devices used to effect this thermomechanical work, the time may vary from 10 seconds to 20 minutes and may be determined by the person skilled in the art on basis of his general knowledge and control of the properties of the composition used in the form of a tire tread, knowing that it is advisable to maximize the ratio of the 300% elongation modulus to the 100% elongation modulus for each composition. Thus the thermomechanical work can include only a single thermomechanical step of suitable duration, temperature and intensity, or it can include several thermomechanical steps which can be separated by at least one cooling step. As preferential thermomechanical work in several steps, there is particularly suitable work comprising two thermal steps, each reaching a maximum temperature greater than 145° C. separated by a cooling step to a temperature below 100° C. During the first step, the copolymer prepared in solution, as well as the silica and the reinforcing agent, the plasticizer, and the extender oil, if any, are mixed mechanically until the mixture reaches a temperature of more than 145° C. and, preferably, a temperature of between 145° C. and 170° C. The block of gum obtained is then cooled at a temperature less than 100° C., and preferably 60° C., and then in a second step it is subjected to mechanical work in an internal mixer while at the same time all the other components except the vulcanization system are added until the mixture reaches a temperature above 145° C. and preferably a temperature between 145° C. and 170° C. In a particularly preferred manner, the maximum temperatures of the two thermal steps are identical and reach 165° C. To the block of rubber obtained at the end of the second thermal step, the entire sulfur vulcanization system comprising the sulfur and the vulcanization accelerators is added by mechanical finishing work, for instance on an external mixer at a temperature of below 100° C. The composition is then drawn into sheets for shaping and vulcanization at the desired moment at a conventional temperature and by conventional means. The average projected area of the silica is between 7000 and 8400 nm$^2$ in the composition obtained, as well as in treads and tires produced by means of the composition in accordance with the invention.

The excellent compromise of the properties is also obtained when the copolymer prepared in solution, used alone or blended with another diene elastomer, is a copolymer starred by means of a branching agent, such as for instance one of the branching agents described in French Patent 2 053 786, or a copolymer having a silane group such as obtained by reaction of a copolymer with terminal C-Li function with a functionalizing agent, such as described in published Japanese Patent Application No. 56-104 906. This excellent compromise in the properties is also obtained when the copolymer prepared in solution is a copolymer subjected to coupling, grafting or starring, as known per se.

The invention is explained by way of illustration and not of limitation by the examples. In the various examples, the final properties of the composition in accordance with the invention and of the control compositions are expressed in the form of properties of conventionally manufactured radial carcass tires of size 175/70-13 which are identical in all points aside from the constitution of the component rubber composition of the tread. The different properties are evaluated as follows:

transverse adherence on wet ground: determination of the limit of adherence on a sprinkled circular track of a passenger vehicle describing circles at the highest possible stabilized speed;

adherence on wet ground: determination of the time taken by a passenger car to pass over a sprinkled path comprising different compositions of road surfacings having straight lines and curves;

adherence on snow-covered ground: determination of the behavior and the performance of tires on different states of snow found in winter road travel;

rolling resistance to travel: measured on the fly wheel in accordance with SAE method J 12 69 of June 1980;

wear life: determined by the mileage travelled until the wear reaches the wear indicators arranged in the grooves. All the values obtained greater than 100 express an improvement in the properties measured;

travel noise: determined by measurement on track edge by the so-called "coast down" method at 60 and 80 km/h by measurement of the acoustic power. It is expressed in decibels dB(A). An improvement of 1 dB(A), as compared with the reference value, is noted as −1 dB(A);

300% elongation (MA300) and 100% (MA 100) elongation moduli: measurements carried out in accordance with ISO standard 37.

EXAMPLE 1

In this example, a tire tread formed of a composition in accordance with the invention coming from thermomechanical working comprising two thermal steps (Test I) is compared with four different treads in accordance with the prior art: the first consisting of a conventional composition of an SBR prepared in emulsion having solely carbon black as filler (Test T), the second formed of a conventional composition having a base of an SBR prepared in emulsion having solely a conventionally employed silica as reinforcing filler (Test C), the third also having a base of an SBR prepared in emulsion and having as reinforcing filler solely the particulate silica selected for the composition according to the invention from among the silicas described in European Patent Application 157 703 (Test S), and the fourth formed of an SBR prepared in solution used in blending with polybutadiene having solely carbon black as filler (Test N).

For these tests, the maximum temperature of the two thermal steps is 165° C. and the following compositions for which all parts are expressed in weight were used:

TABLE I

| COMPONENTS | TESTS | | | | |
|---|---|---|---|---|---|
| | T | C | S | N | I |
| SBR emulsion | 100 | 100 | 100 | | |
| SBR solution/PB | | | | 75/25 | 75/25 |
| Black N234 | 80 | | | 80 | |
| Conventional Silica Reinforcing agent | | 80 12.8 | 12.8 | | 12.8 |
| Silica according to European Patent 157 703 | | | 80 | | 80 |
| Aromatic oil (Sundex 8125) | 37.5 | 37.5 | 37.5 | 32.5 | 32.5 |
| Zinc oxide | 2.5 | 2.5 | 2.5 | 2.5 | 2.5 |
| Stearic acid | 1 | 1 | 1 | 1 | 1 |
| Antioxidant | 2 | 2 | 2 | 2 | 2 |
| Paraffin wax | 1.5 | 1.5 | 1.5 | 1.5 | 1.5 |
| Sulfur | 1.35 | 1.4 | 1.4 | 1.35 | 1.4 |
| Sulfenamide | 1.35 | 1.7 | 1.7 | 1.35 | 1.7 |
| Diphenylguanidine | — | 2 | 2 | — | 2 |

The characteristics of the following components are as follows:

SBR emulsion: butadiene-styrene copolymer prepared in emulsion having a styrene content of 32%, a content of trans-1,4 bonds of 74% and of vinyl bonds of 16% and a Tg of −38° C., sold under the trade name Cariflex 5820 by Shell.

SBR solution: butadiene-styrene copolymer prepared in solution by the method described in French Patent Application 2 295 972, having a styrene content of 26%, a vinyl-bond content of 60%, a trans-1,4 bond content of 22%, a cis-1,4 bond content of 18% and a Tg of −25° C. and subjected to starring with diethylene glycol by the method described in French Patent 2 053 786.

Polybutadiene (PB) is a polybutadiene having 93% cis-1,4 bonds, obtained by the method described in French Patent 1 436 607.

Black N234: BET 120 m$^2$/g, DBP 125 ml/100 g, measured in accordance with ASTM standards D4567 and D 2414, respectively;

Conventional silica: BET 190 m$^2$/g; CTAB: 160 m$^2$/g; projected area of between 7300 and 7800 nm$^2$ marketed by Rhone Poulenc under the trade name RP 175;

Silica according to European Patent 157 703: BET 180 m$^2$/g, CTAB: 160 m$^2$/g; average projected area before use 10,530 nm$^2$ and after thermomechanical mixing 7600 nm$^2$;

Antioxidant: N-(1,3-dimethylbutyl)-N'-phenyl-p-phenylenediamine;

Paraffin wax: mixture of macro and micro crystalline waxes;

Sulfenamide: n-cyclohexyl-2-benzothiazyl-sulfenamide;

Reinforcing agent: mixture in a ratio of 1:1 of carbon black N 330 and polysulfided organosilane marketed by Degussa under the reference No. X 50S.

The properties of these compositions are set forth in Table 2 and the arbitrary value of 100 has been attributed to the composition T, which is representative of the compositions used up to the present time by all tire manufacturers, while the experimental values found for the other compositions are indicated in relative values referred to the reference value of 100, a value greater than 100 indicating an improvement in the property in question.

TABLE 2

| PROPERTIES | TESTS | | | | |
|---|---|---|---|---|---|
| | T | C | S | N | I |
| Transverse adherence on wet ground | 100 | 105 | 106 | 101 | 106 |
| Adherence on wet ground | 100 | 103 | 104 | 99 | 103 |
| Adherence on snow-covered ground | 100 | 104 | 104 | 100 | 104 |
| Rolling Resistance | 100 | 113 | 114 | 101 | 115 |
| Travel noise (dB = decibel) | 100 | −1 Db(A) | −1 Db(A) | 100 | −1 dB(A) |
| Wear life | 100 | 75 | 85 | 94 | 102 |

It is noted that the composition in accordance with the invention has the best compromise between very contradictory properties and this very significantly so while exhibiting less travel noise. This composition is excellently suited for a high-performance tier in all seasons. Furthermore, it is noted that this better compromise is obtained only by the combination of a copolymer solution with the selected silica which in the tires corresponding to Tests S and I has an average projected area of 7600 nm$^2$.

EXAMPLE 2

This example shows that this excellent compromise of contrary properties is obtained with copolymers of a conjugated diene and an aromatic vinyl compound prepared in solution of varied microstructures and that they are used alone or blended with another diene elastomer.

One operates in the same manner as in Example 1, aside from the fact that an SBR solution of different micro-structure is used. The compositions employed and their properties are set forth in Tables 3 and 4:

TABLE 3

| COMPONENTS | TESTS | |
|---|---|---|
| | T | I$_1$ |
| SBR emulsion | 100 | |
| SBR solution | | 100 |
| Black N234 | 80 | |
| Conventional silica reinforcing agent | | 12.8 |
| Silica according to European Patent 157 703 | | 80 |
| Aromatic oil (Sundex 8125) | 37.5 | 32.5 |
| Zinc oxide | 2.5 | 2.5 |
| Stearic acid | 1 | 1 |
| Antioxidant | 2 | 2 |
| Paraffin wax | 1.5 | 1.5 |
| Sulfur | 1.35 | 1.4 |
| Sulfenamide | 1.35 | 1.7 |
| Diphenylguanidine | | 2 |

The copolymer of butadiene-styrene prepared in solution which is used in this example has a styrene content of 32% and a content of vinyl bonds of 24%, of trans 1,4 bonds of 48% and of cis-1,4 bonds of 28% and a Tg of −38° C.

TABLE 4

| PROPERTIES | TESTS | |
|---|---|---|
| | T | I$_1$ |
| Transverse adherence on wet ground | 100 | 106 |
| Adherence on wet ground | 100 | 104 |

TABLE 4-continued

| PROPERTIES | TESTS | |
|---|---|---|
| | T | I1 |
| Adherence on snow-covered ground | 100 | 105 |
| Rolling resistance | 100 | 115 |
| Travel noise (dB = decibel) | 100 | −1 Db(A) |
| Wear life | 100 | 98 |

EXAMPLE 3

This example shows that the improvement in the contrary properties is greater the larger the amount of selected silica filler as compared with the other fillers present.

The compositions used in this example are identical to those of Tests N and I of Table 1, except for the amount and nature of the filler used, the concentration of reinforcing agent being proportional to the concentration of silica present.

Four tests are carried out in which only the respective proportions of silica and carbon black are changed. The properties are set forth in Table 5.

TABLE 5

| PROPERTIES | TESTS | | | |
|---|---|---|---|---|
| | N | I | 1 | 2 |
| | 100% Black | 100% Silica | 75% Silica 25% Black | 75% Black 25% Silica |
| Adherence on wet ground | 99 | 103 | 102 | 100 |
| Adherence on snow-covered ground | 100 | 104 | 103 | 101 |
| Rolling Resistance | 101 | 115 | 111 | 103 |
| Wear life | 94 | 102 | 99 | 96 |

EXAMPLE 4

This example shows that this excellent compromise of opposing properties is obtained only when the thermomechanical work is sufficiently intense in temperature and time within the temperature range of 130° C. to 180° C. the number of thermal steps being considered of little importance.

In this example, a test I2 is carried out operating in precisely the same manner as in the test I of Example 1, except for the fact that a single thermal step of maximum temperature of 165° C. is carried out, followed by cooling and the finishing step, a test I3 being carried out operating in the same manner as in test I2 except that the duration of the heat step was lengthened in order to reach about 5 minutes and a test I4 was carried out, operating in the same manner as in test I2 except that the maximum temperature reached is 150° C. and the duration of the thermomechanical step is about 9 minutes. The MA300/MA100 ration for compositions I and I2 is close to 4 and close to 3.3, respectively. The properties of the tires having the treads forming the object of tests I, I2, I3 and I4 are set forth in Table 6.

TABLE 6

| PROPERTIES | TESTS | | | |
|---|---|---|---|---|
| | I | I2 | I3 | I4 |
| Transverse adherence on wet ground | 103 | 102 | 103 | 103 |
| Rolling Resistance | 115 | 112 | 115 | 115 |
| Wear life | 102 | 92 | 102 | 100 |

It is noted that only compositions I, I3 and I4, for which the temperature/time combination has reached the required intensity, have excellent resistance to wear at the same time as excellent rolling resistance and very good adherence on wet ground, which is not true of the composition of test I2, which shows insufficient resistance to wear.

EXAMPLE 5

This example shows that this excellent compromise of opposing properties is also obtained when the copolymer of conjugated diene and vinyl aromatic compound prepared in solution is a functionalized copolymer.

The composition used in test F is identical to that used in test I of Example 1 aside from the fact that the live C-Li ends of the copolymer prepared in solution are forced to react, as known per se, with 3-chloropropyltriethoxysilane.

The properties are set forth in Table 7:

TABLE 7

| PROPERTIES | TESTS | |
|---|---|---|
| | T | F |
| Adherence on wet ground | 100 | 103 |
| Adherence on snow-covered ground | 100 | 104 |
| Rolling resistance | 100 | 120 |
| Wear life | 100 | 98 |

It is noted that the use of polymers which was prepared in solution and functionalized furthermore makes it possible to benefit from the gain in resistance to travel obtained by the functionalizing of the copolymer prepared in solution.

I claim:

1. A sulfur-vulcanizable rubber composition formed by a process comprising the steps of
   (a) preparing a base from a copolymer of a conjugated diene and an aromatic vinyl compound prepared by solution polymerization in a hydrocarbon solvent having a total content of aromatic vinyl compound of between 5% and 50% and a glass transition temperature (Tg) of between 0° C. and −80° C., and
   (b) thermomechanically working the base with a filler, the majority portion of which is a silica having a BET surface area of between 100 and 250 $m^2/g$, a CTAB surface area of between 100 and 250 $m^2/g$, an oil absorption measured in DBP of between 150 and 250 ml/100 g, and an average projected area of the aggregates greater than 8500 $nm^2$ before working and between 7000 and 8400 $nm^2$ after working, wherein the silica is added in an amount of from 30 to 150 parts by weight per 100 parts by weight of copolymer, together with other additives conventionally employed with the exception of the vulcanization system, said thermomechanical working including at least one thermal step reaching a maximum temperature of between 130° C. and 180° C. for a suitable period of time which is a function of the temperature selected for the thermomechanical working and of the nature and volume of the components subjected to the said thermomechanical working and which is between 10 seconds and 20 minutes, and a finishing step during which the vulcanization system is added by mechanical working at a temperature below the vulcanization temperature.

2. A rubber composition according to claim 1, wherein the thermomechanical working is performed for a period of time sufficient to maximize the ratio of 300% elongation modulus to 100% elongation modulus.

3. A rubber composition according to claim 1, wherein the thermomechanical working includes at least two thermal steps, each reaching a temperature of ore than 145° C., separated by at least one cooling step to a temperature below 100° C. and wherein, during the finishing step, the vulcanization system is added by mechanical working at a temperature below 100° C.

4. A rubber composition according to claim 3, wherein the temperature of the two thermal steps is between 145° C. and 165° C.

5. A rubber composition according to claim 1, wherein the copolymer prepared in solution is a copolymer of styrene having a styrene content of between 25 and 30% by weight and a content of vinyl bonds of the butadiene part of between 55% and 65%, a content of trans-1,4 bonds of between 20 and 25%, and a glass transition temperature of between −20° C. and −30° C.

6. A rubber composition according to claim 1, wherein the copolymer prepared in solution is starred with an agent containing the group

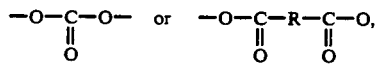

R being a hydrocarbon radical.

7. A rubber composition according to claim 1, wherein the base further comprises up to 70 parts by weight of at least one additional diene elastomer selected from among natural rubber, polysoprene and polybutadiene.

8. A rubber composition according to claim 7, wherein the additional diene elastomer is polybutadiene having more than 90% cis-1,4 bonds.

9. A rubber composition according to claim 1, wherein the filler comprises carbon black or another reinforcing filler in a minority quantity by weight as compared with the quantity of silica.

10. A rubber composition according to claim 1, wherein the copolymer prepared in solution is modified by reaction at the end of polymerization with a silane having the formula X—R'$_m$—Si(OR)$_3$, in which X represents a halogen atom and R a methyl or ethyl group, n represents 0 or 1, m represents 3 or 4 and R' an aliphatic radical.

11. A tire tread, comprising a rubber composition formed by a process comprising the steps of
(a) preparing a base from a copolymer of a conjugated diene and an vinyl aromatic compound prepared by solution polymerization in a hydrocarbon solvent, having a total content of aromatic vinyl compound of between 5% and 50% by weight and a glass transition temperature (Tg) of between 0° C. and −80° C., and
(b) thermomechanically working the base with a filler, the majority portion of which is a silica having a BET surface area of between 100 and 250 m$^2$/g, a CTAB surface area of between 100 and 250 m$^2$g, an oil absorption measured in DBP of between 150 and 250 ml/100 g, and an average projected area of the aggregates greater than 8500 nm$^2$ before working and between 7000 and 8400 nm$^2$ in the tread wherein the silica is added in an amount of from 30 to 150 parts by weight per 100 parts by weight of copolymer, together with other additives conventionally employed additives, with the exception of the vulcanization system, said thermomechanical working including at least one thermal step reaching a maximum temperature of between 130° C. and 180° C. for a suitable period of time which is a function of the temperature selected for the thermomechanical working and of the nature and volume of the components subjected to said thermomechanical working, and which is between 10 seconds and 20 minutes, and a finishing step during which the vulcanization system is added by mechanical working at a temperature below the vulcanization temperature.

12. A tire tread according to claim 11, wherein the thermomechanical working is performed for a period of time sufficient to maximize the ratio of the 300% elongation modulus to the 100% elongation modulus.

13. A tire tread according to claim 11, wherein thermomechanical working at least two steps, each reaching a temperature of between 145° C. and 165° C.

14. A tire tread according to claim 11, wherein the copolymer prepared in solution is a butadiene styrene copolymer having a styrene content of between 25 and 30% by weight and a content of vinyl bonds of the butadiene part of between 55% and 65%, a trans-1,4 bond content of between 20% and 25% and a glass transition temperature of between −20° C. and −80° C.

15. A tire tread according to claim 11, wherein the base further comprises up to 70 parts by weight of at least one additional diene elastomer selected from among natural rubber, polyisoprene and polybutadiene.

16. A tire tread according to claim 11, wherein the filler comprises carbon black or another reinforcing filler in a minority amount by weight referred to the amount of silica.

17. A tire having a sulfur-vulcanized tread comprising a rubber composition formed by a process comprising the steps of
(a) preparing a base from a copolymer of a conjugated diene and an aromatic vinyl compound prepared by solution polymerization in a hydrocarbon solvent having a total content of aromatic vinyl compound of between 5% and 50% and a glass transition temperature (Tg) of between 0° C. and −80° C., and
(b) mechanically working the base with a filler, the majority portion of which is of a silica having a BET surface area of between 100 and 250 m$^2$/g, a CTAB surface area of between 10 and 250 m$^2$g, an oil absorption measured in DBP of between 150 and 250 ml/100 g, and an average projected area of the aggregates greater than 8500 nm$^2$ before working and between 7000 and 84000 nm$^2$ in the tire, wherein the silica is added in an amount of from 30 to 150 parts by weight per 100 parts by weight of copolymer, together with other additives conventionally employed with the exception of the vulcanization system said thermomechanical working including at least one thermal step reaching a maximum temperature of between 130° C. and 180° C. for a suitable period of time which is a function of the temperature selected for the thermomechanical working and of the nature and volume of the components subjected to said thermomechanical working and which is between 10 seconds and 20 minutes, and a finishing step during which the vulcanization system is added by mechanical working at a temperature below the vulcanization temperature.

18. A method of preparing a sulfur-vulcanizable rubber composition having a base of a copolymer of conjugated diene and an aromatic vinyl compound containing silica as filler, comprising the steps of
   (a) preparing a base from a copolymer of a conjugated diene and an aromatic vinyl compound prepared by solution polymerization in a hydrocarbon solvent having a styrene content of between 5% and 50% and a glass transition temperature of between 0° C. and −80° C., along or in association with another diene elastomer, a silica having a BET surface area of between 100 and 250 m²/g, a CTAB surface area of between 100 and 250 m²/g, a CTAB surface area of between 100 and 250 m²/g, an oil absorption measured in DBP of between 150 and 250 ml/100 g, and an average projected area of the aggregates greater than 8500 nm² before and possibly another reinforcing filler present in a minority amount by weight referred to the silica, wherein the silica is added in an amount of from 30 to 150 parts by weight per 100 parts by weight of copolymer, together with other additives conventionally used with the exception of the vulcanization system in such a manner that said thermomechanical working including at least one thermal step reaching a maximum temperature of between 130° C. and 180° C. for a suitable period of time which is a function of the temperature selected for the thermomechanical working and of the nature and volume of the components subjected to said thermomechanical working, which decreases the average projected area of the silica aggregates so that it is between 7000 and 8400 nm² after thermomechanical mixing, the said period of time being between 10 seconds and 20 minutes and that the vulcanization system is then incorporated in the resultant mixture by mechanical finishing work at a temperature below the vulcanization temperature.

19. A method according to claim 18, wherein the thermomechanical working is performed for a period of time sufficient to maximize the ratio of the 300% elongation modulus to the 100% elongation modulus.

* * * * *

UNITED STATES PATENT AND TRADEMARK OFFICE
CERTIFICATE OF CORRECTION

PATENT NO. : 5,227,425
DATED : July 13, 1993
INVENTOR(S) : Rauline

It is certified that error appears in the above-identified patent and that said Letters Patent is hereby corrected as shown below:

Col. 2, line 2, "unexpectantly" should read --unexpectedly--; line 52, "vehicle" should read --vehicle tire--. Col. 3, line 51, "cis 1,4" should read --cis-1,4--. Col. 4, line 46, "Which" should read --which--. Col. 8, line 24, "tier" should read --tire--; line 61, "trans 1,4" should read --trans-1,4--. Col. 9, line 54, "ration" should read --ratio--. Col. 10, line 29, "was" should read --were--. Col. 11, line 17, "of styrene" should read --of butadiene and styrene--; line 45, that portion of the formula reading "X" should read --$X_n$--; line 52, "an vinyl" should read --a vinyl--. Col. 12, line 1, delete "additives" (second occurrence); line 19, "wherein" should read --wherein the--; line 20, "working" should read --working includes--; line 55, "84000" should read --8400--. Col. 13, line 12, "along" should read --alone--; delete line 16; line 19, "before" should read --before working--. Col. 14, line 4, "including" should read --includes--.

Signed and Sealed this

Thirty-first Day of May, 1994

Attest:

BRUCE LEHMAN

Attesting Officer

Commissioner of Patents and Trademarks